United States Patent
Pierzchalski et al.

(10) Patent No.: US 9,606,999 B2
(45) Date of Patent: Mar. 28, 2017

(54) LOCK FREE DATA TRANSFER

(71) Applicants: Zawisza Pierzchalski, Heidelberg (DE); Mariusz Debowski, Sandhausen (DE)

(72) Inventors: Zawisza Pierzchalski, Heidelberg (DE); Mariusz Debowski, Sandhausen (DE)

(73) Assignee: SAP SE, Walldorf (DE)

(*) Notice: Subject to any disclaimer, the term of this patent is extended or adjusted under 35 U.S.C. 154(b) by 924 days.

(21) Appl. No.: 13/788,060

(22) Filed: Mar. 7, 2013

(65) Prior Publication Data

US 2014/0258560 A1  Sep. 11, 2014

(51) Int. Cl.
G06F 3/06 (2006.01)
G06F 17/30 (2006.01)
H04L 29/08 (2006.01)

(52) U.S. Cl.
CPC ........ *G06F 17/30171* (2013.01); *G06F 3/065* (2013.01); *G06F 3/0647* (2013.01); *G06F 17/30362* (2013.01); *H04L 67/1097* (2013.01)

(58) Field of Classification Search
CPC ......... G06F 17/30171; G06F 17/30362; G06F 3/0647; G06F 3/065; H04L 67/1097
USPC ........................ 709/246, 213, 216
See application file for complete search history.

(56) References Cited

U.S. PATENT DOCUMENTS

| 6,922,744 | B1 | 7/2005 | Sipple et al. |
| 8,233,499 | B2 | 7/2012 | Patwardhan et al. |
| 2003/0115434 | A1* | 6/2003 | Mahalingam ..... G06F 17/30067 711/165 |
| 2006/0161746 | A1* | 7/2006 | Wong .................. G06F 11/1662 711/162 |
| 2009/0064136 | A1* | 3/2009 | Dow ..................... G06F 9/5077 718/1 |
| 2010/0082920 | A1* | 4/2010 | Larson ................ G06F 11/1662 711/162 |
| 2011/0066597 | A1* | 3/2011 | Mashtizadeh ......... G06F 3/0617 707/640 |
| 2011/0264880 | A1* | 10/2011 | Ylonen ............... G06F 12/0261 711/162 |
| 2014/0156632 | A1* | 6/2014 | Yu ..................... G06F 17/30469 707/713 |

* cited by examiner

*Primary Examiner* — Abdulkader M Alriyashi
(74) *Attorney, Agent, or Firm* — Schwegman Lundberg & Woessner, P.A.

(57) ABSTRACT

A system receives a request to transfer an object, and transfers the object without placing a lock on the object such that the object can still be processed by a service or a function during the transfer. Upon completion of the transfer of the object, the system determines if the object was modified by the processing during the transfer, and the system re-transfers the object when the object was modified by the processing during the transfer.

11 Claims, 4 Drawing Sheets

LOCK FREE DATA TRANSFER

TECHNICAL FIELD

The present disclosure relates to the transfer of data from one system to another system, and in an embodiment, but not by way of limitation, the transfer of data from one system to another system without having to lock the data.

BACKGROUND

Current methods of mass data transfers lock the transferred objects in order to assure the integrity and consistency of the transferred data. This locking of the data leads to the unavailability of functions and services related to the transferred data. This situation applies in many cases also to software update events or configuration change events, where a system landscape or its parts need to be stopped.

DETAILED DESCRIPTION

Figure 1:
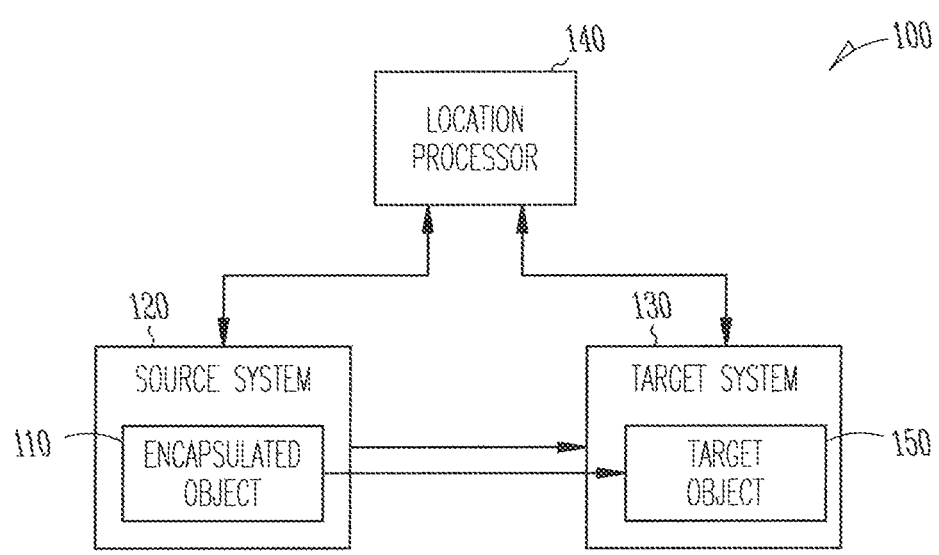
FIG. 1 is a block diagram of an example embodiment of a system for transferring data from one location to another location without having to use a lock on the data.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the fill range of equivalents to which the claims are entitled. In the drawings, like numerals refer to the same or similar functionality throughout the several views.

FIG. 1 is a block diagram of an example embodiment of a system 100 for transferring data from one location to another location without having to use a lock on the data. To transfer data from one location to another without having to lock the data, the system 100 can include the following features. First, data are stored in a way such that the data are contained within encapsulated objects 110. These objects 110 should be atomized, that is, they should be independent from other objects. This can be done by building the smallest possible units of data that can be encapsulated. For example, if the system relates to employee data, several objects may be used for the employee data such as an object related to an employee's address information, an object related to an employee's health care information, and an object relating to an employee's education and work history. Second, due at least in part to the data being stored in the smallest possible units of encapsulated data, the services or functions of the system, when performing data manipulation to the encapsulated data, can provide the service or function and access a minimal and limited number of objects. Third, the system can communicate with another system or other systems of similar kind, so that a single system does not necessarily need to store all existing objects. Fourth, the system or systems are capable of communicating with a location service or processor that can provide an identification of the system wherein a desired encapsulated object can be found in order to be able to send a service request to the appropriate system.

Using encapsulated objects and the just described features associated with the encapsulated objects, a lock free, live data transfer process of a single encapsulated object can be executed. The transfer can be executed for many objects in a loop and/or in a parallel fashion to achieve high performance or high data throughput.

A dedicated object is selected in a source location, processor, or system 120 for transfer to a target location, processor, or system 130. A location service is informed that the transfer has commenced. The object 110 is read from the source system. No lock is placed on the object. Since no lock is placed on the object, the object can still be used (and possibly changed) in the source system 120. Thereafter, the object is adjusted in structure if necessary and saved within the target system 130. An inquiry is transmitted to the source system and the location service inquiring as to whether the object in question was changed within the source system 120 by any service or function during the transfer. If the object was changed, the object is deleted from the target system 130 and the transfer procedure is repeated. If the object was not changed, the location service points to the target system as the container for the object. The object can be then be deleted from the source system 120.

Because in an embodiment the procedure makes use of the location service providing information on the object level, the need for the system, landscape or its parts to be stopped disappears. In contrast, existing methods process the data from a technical perspective only. This leads to a necessary downtime for the final data synchronization and activation. An embodiment, when applied to logically encapsulated objects, allows the lock free consistent live data transfer of encapsulated objects or groups of such objects.

The lock tree data transfer systems can be applied to any system landscape or its parts for several purposes such as migration, software updates, or security patches. Additionally, the lock free data transfer system can be applied to configuration changes of running applications.

Figure 2A:
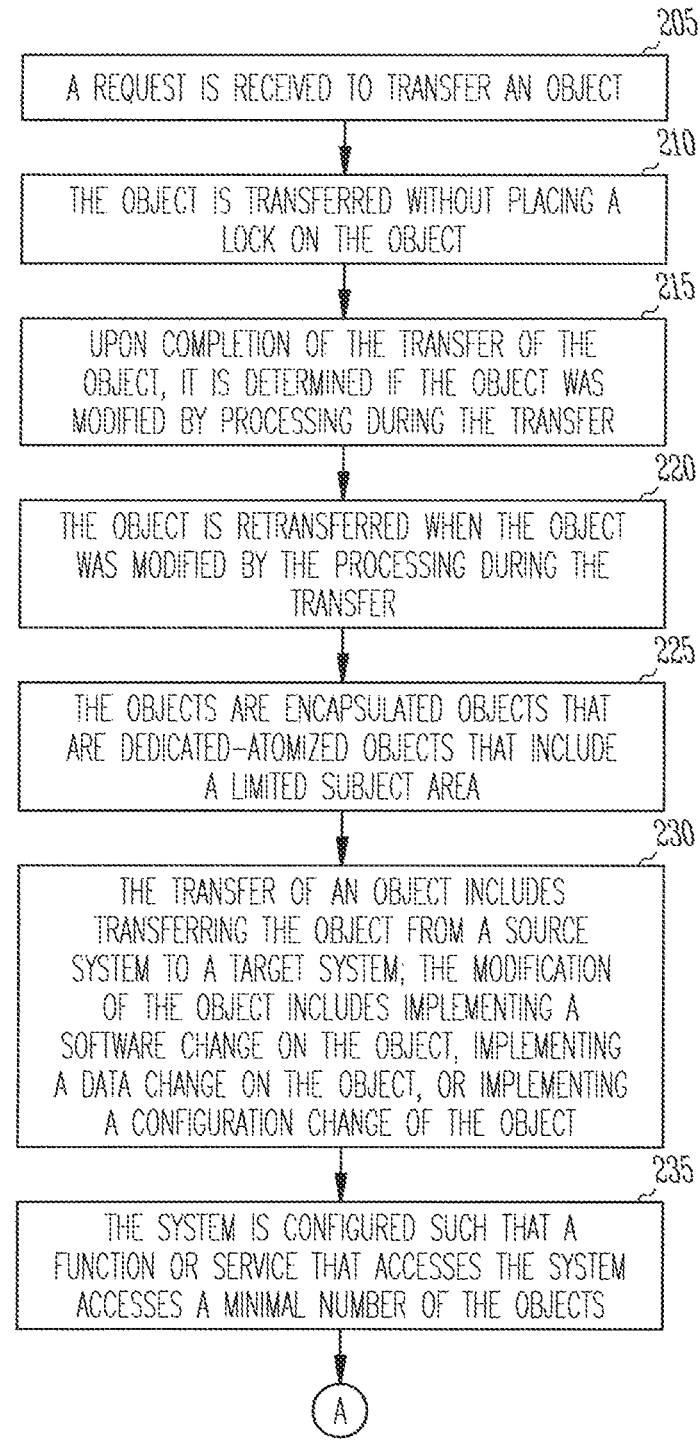
FIGS. 2A and 2B are a flowchart-like diagram illustrating steps and features of a system and method for transferring data from one location to mother location without having to use a lock on the data.
Figure 2B:
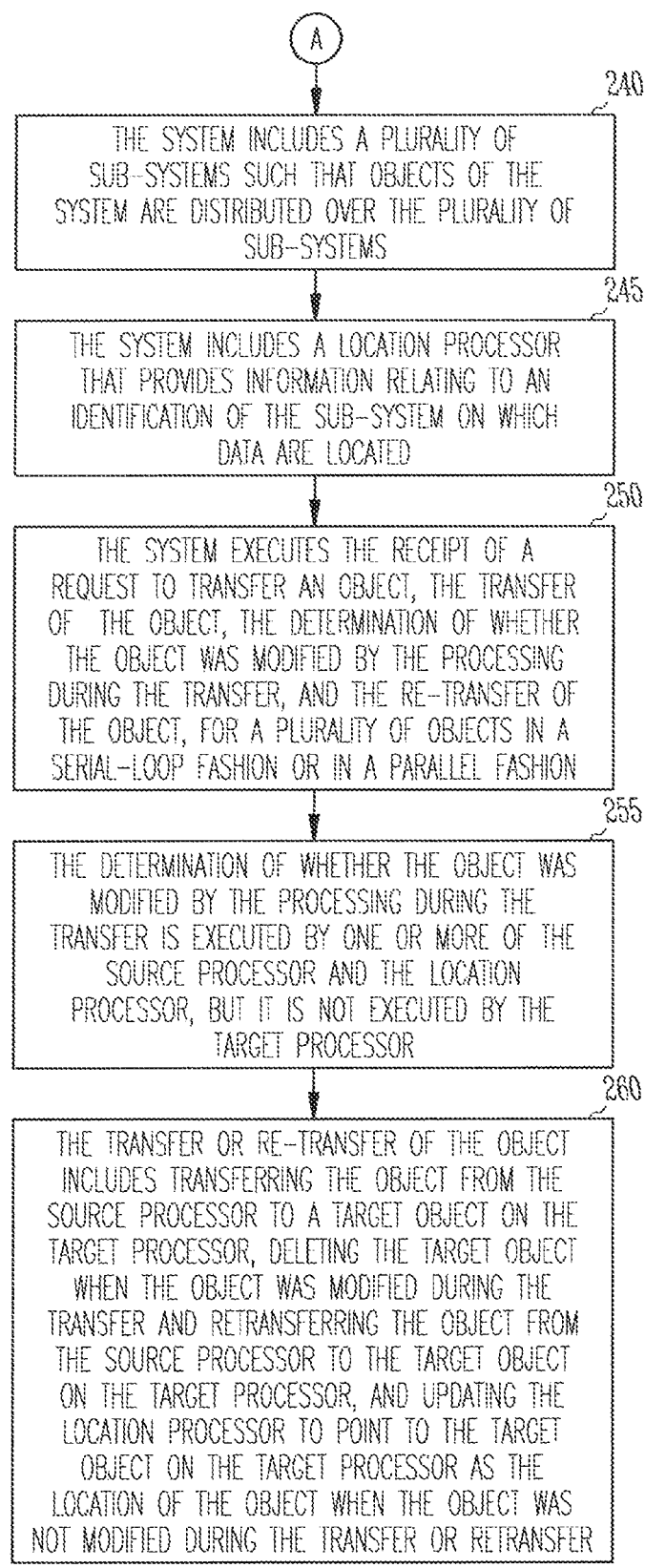

FIGS. 2A and 2B are a flowchart-like diagram of features and steps of an example system and process 200 for implementing a lock free data transfer. FIG. 2 includes a number of process blocks 205-260. Though arranged serially in the example of FIG. 2, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules.

Thus, any process flow is applicable to software, firmware, hardware, and hybrid implementations.

Referring to FIG. 2, at 205, a request is received to transfer an object. At 210, the object is transferred without placing a lock on the object. Because a lock is not placed on the object, the object can still be processed by a service or a function during the transfer. As indicated at 215, upon completion of the transfer of the object, it is determined if the object was modified by the processing during the transfer. At 220, the object is retransferred when the object was modified by the processing during the transfer.

At 225, the objects are encapsulated objects. The encapsulated objects further are dedicated-atomized objects that include a limited subject area. For example, if the system is related to employee data, a first object may be limited to employee address data, a second object may be limited to employee health care data, and a third object may be limited to employee education and work history data. Additionally, the dedicated-atomized objects are independent from other encapsulated objects.

At 230, the transfer of an object includes transferring the object from a source system 120 to a target system 130. As further indicated at 230, the transfer of the object includes implementing a software change on the object, implementing a data change on the object, or implementing a configuration change of the object. At 235, the system is configured such that a function or service that accesses the system accesses a minimal number of the objects. To implement a particular functionality the system can access a minimum number of objects because the objects are dedicated and atomized. Consequently, if a particular functionality of the system only needs data relating to an employee's work history, then only that dedicated atomized object relating to an employee's work history need be accessed. That is, only a minimal number of objects are accessed.

At 240, the system includes a plurality of sub-systems such that objects of the system are distributed over the plurality of sub-systems. At 245 the system includes a location processor 140 that provides information relating to an identification of the sub-system on which data are located.

At 250, the system executes the receipt of a request to transfer an object, the transfer of the object, the determination of whether the object was modified by the processing during the transfer, and the re-transfer of the object, for a plurality of objects in a serial-loop fashion or in a parallel fashion. At 255, the determination of whether the object was modified by the processing during the transfer is executed by one or more of the source processor 120 and the location processor 140, but it is not executed by the target processor 130.

At 260, the transfer or re-transfer of the object includes transferring the object from the source processor 120 to a target object 150 on the target processor 130, deleting the target object when the object vas modified by the processing during the transfer and retransferring the object from the source processor 120 to the target object on the target processor 130, and updating the location processor 140 to point to the target object on the target processor 130 as the location of the object when the object was not modified by the processing during the transfer or retransfer.

Figure 3:
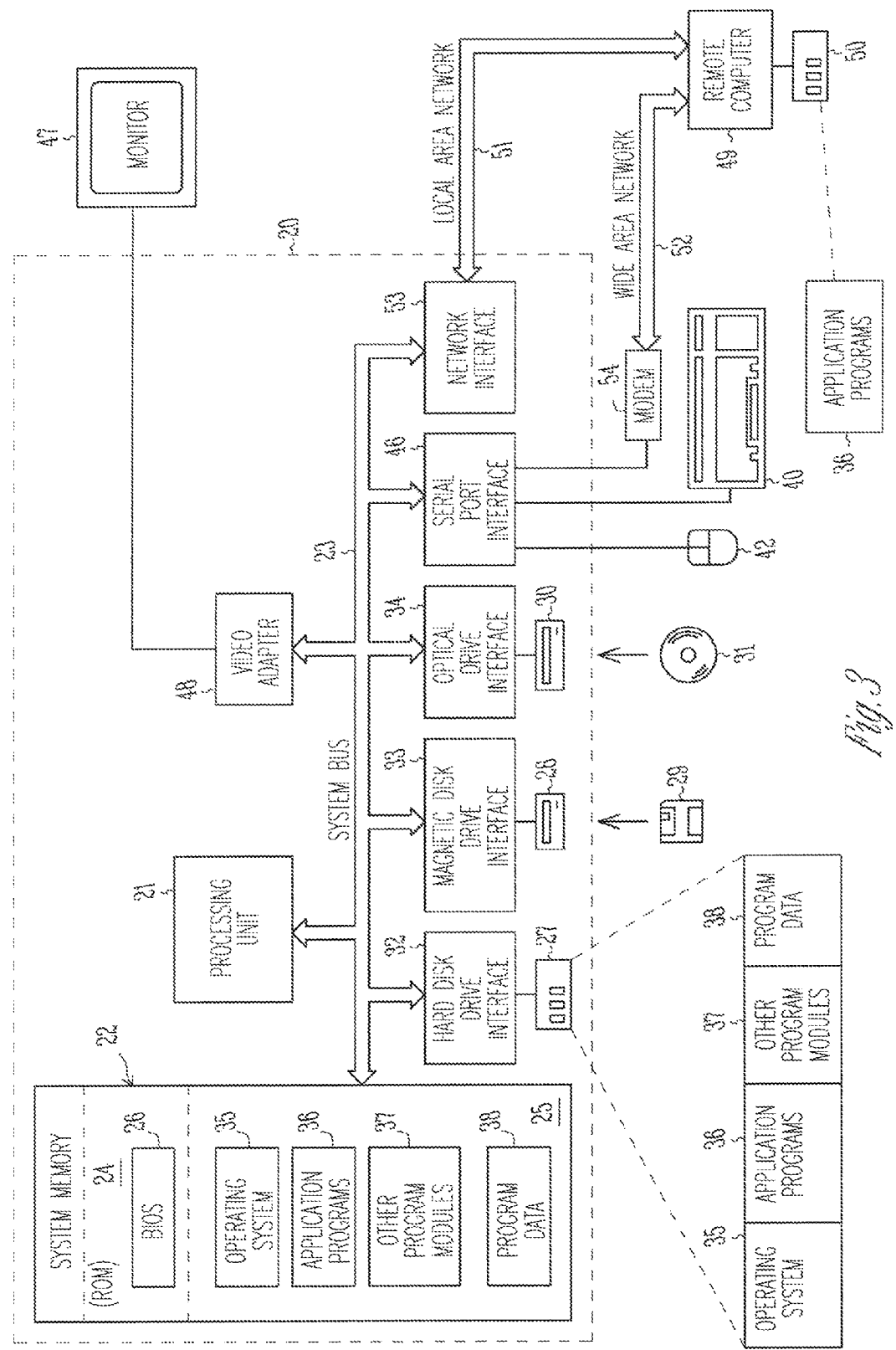
FIG. 3 is a block diagram of an example embodiment of a computer system upon which one or more embodiments of the present disclosure can execute.

FIG. 3 is an overview diagram of hardware and an operating environment in conjunction with which embodiments of the invention may be practiced. The description of FIG. 3 is intended to provide a brief, general description of suitable computer hardware and a suitable computing environment in conjunction with which the invention may be implemented. In some embodiments, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computer environments where tasks are performed by I/O remote processing devices that are linked through a communications network. In a distributed computing environment, program modules may be located in both local and remote memory storage devices.

In the embodiment shown in FIG. 3, a hardware and operating environment is provided that is applicable to any of the servers and/or remote clients shown in the other Figures.

As shown in FIG. 3, one embodiment of the hardware and operating environment includes a general purpose computing device in the form of a computer 20 (e.g., a personal computer, workstation, or server), including one or more processing units 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a multiprocessor or parallel-processor environment. A multiprocessor system can include cloud computing environments. In various embodiments, computer 20 is a conventional computer, a distributed computer, or any other type of computer.

The system bus 23 can be any of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36 other program modules 37, and program data 38. A plug in containing a security transmission engine for the present invention can be resident on any one or number of these computer-readable media.

A user may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 47 can display a graphical user interface for the user. In addition to the monitor 47, computers typically include other peripheral output devices (not shown), such as speakers and printers.

The computer 20 may operate in a networked environment using logical connections to one or more remote computers or servers, such as remote computer 49. These logical connections are achieved by a communication device coupled to or a part of the computer 20; the invention is not limited to a particular type of communications device. The remote computer 49 can be another computer, a server, a router, a network PC, a client, a peer device or other common network node, and typically includes many or all of the elements described above I/O relative to the computer 20, although only a memory storage device 50 has been illustrated. The logical connections depicted in FIG. 3 include a local area network (LAN) 51 and/or a wide area network (WAN) 52. Such networking environments are commonplace in office networks, enterprise-wide computer networks, intranets and the internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the interact. The modem 54, which may be internal or external, is connected to the system bus 23 via the serial port interface 46. In a networked environment, program modules depicted relative to the computer 20 can be stored in the remote memory storage device 50 of remote computer, or server 49, it is appreciated that the network connections shown are exemplary and other means of, and communications devices for, establishing a communications link between the computers may be used including hybrid fiber-coax connections. T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

Thus, an example system, method and machine readable medium for transferring data in a lock free manner have been described. Although specific example embodiments have been described, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

The invention claimed is:

1. A process comprising:
receiving a request to transfer an encapsulated object;
transferring the encapsulated object without placing a lock on the encapsulated object such that the encapsulated object can still be processed by a service or a function during the transferring;
upon completion of the transferring of the encapsulated object, determining if the encapsulated object was modified by a processing during the transferring; and
re-transferring the encapsulated object when the encapsulated object was modified by the processing during the transferring;
wherein the encapsulated object comprises configuration data of an executing application;
wherein the modification to the encapsulated object comprises a configuration change to the executing application;

wherein the encapsulated object comprises a dedicated-atomized object that comprises a limited subject area;

wherein the encapsulated object is independent from other encapsulated objects;

wherein the encapsulated object comprises data that are able to be encapsulated;

wherein a minimal number of a plurality of encapsulated objects is accessed by a function or service;

wherein the plurality of encapsulated objects are distributed over a plurality of sub-systems; and providing information relating to an identification of a sub-system on which the plurality of encapsulated objects are located.

2. The process of claim 1, wherein the transferring of the encapsulated object comprises transferring the encapsulated object from a source system to a target system, and wherein the transfer of the encapsulated object comprises implementing a software change on the encapsulated object.

3. The process of claim 1, wherein the receiving a request to transfer the encapsulated object, the transferring of the encapsulated object, the determining whether the encapsulated object was modified by the processing during the transferring, and the re-transferring of the encapsulated object, are executed for a plurality of encapsulated objects in a serial-loop fashion or in a parallel fashion.

4. The process of claim 1, wherein the determining of whether the encapsulated object was modified by the processing during the transferring is executed by one or more of a source processor and a location processor, but not executed by a target processor.

5. The process of claim 1, wherein the transferring or re-transferring of the encapsulated object comprises transferring the encapsulated object from a source processor to a target encapsulated object on a target processor, deleting the target encapsulated object when the encapsulated object was modified by the processing during the transferring and retransferring the encapsulated object from the source processor to the target encapsulated object on the target processor, and updating a location processor to point to the target encapsulated object on the target processor as a location of the encapsulated object when the encapsulated object was not modified by the processing during the transferring or retransferring.

6. A system comprising:
a computer processor; and
a plurality of encapsulated objects;
wherein the plurality of encapsulated objects comprise dedicated-atomized objects that comprise a limited subject area;
wherein the plurality of encapsulated objects are independent from other encapsulated objects;
wherein the plurality of encapsulated objects comprise data that are able to be encapsulated;
wherein the system is configured such that a function or service that accesses the system accesses a minimal number of the plurality of encapsulated objects;
wherein the system comprises a plurality of sub-systems such that the plurality of encapsulated objects are distributed over the plurality of sub-systems;
wherein the system comprises a location processor that provides information relating to an identification of a sub-system on which the plurality of encapsulated objects are located; and
wherein the system is operable to:
receive a request to transfer an encapsulated object of the plurality of encapsulated objects;
transfer the encapsulated object without placing a lock on the encapsulated object such that the encapsulated object can still be processed by a service or a function during the transfer;
upon completion of the transfer, determine if the encapsulated object was modified by a processing during the transfer; and
re-transfer the encapsulated object when the encapsulated object was modified by the processing during the transfer;
wherein the encapsulated object comprises configuration data of an executing application; and
wherein the modification to the encapsulated object comprises a configuration change to the executing application.

7. The system of claim 6, wherein the transfer of the encapsulated object comprises transferring the encapsulated object from a source system to a target system, and wherein the transfer of the encapsulated object comprises implementing a software change on the encapsulated object, or implementing a data change on the encapsulated object.

8. The system of claim 6, wherein the determination of whether the encapsulated object was modified by the processing during the transfer is executed by one or more of a source processor and a location processor, but not executed by a target processor.

9. The system of claim 6, wherein the transfer or re-transfer of the encapsulated object comprises transferring the encapsulated object from a source processor to a target encapsulated object on a target processor, deleting the target encapsulated object when the encapsulated object was modified by the processing during the transfer and retransferring the encapsulated object from the source processor to the target encapsulated object on the target processor, and updating the location processor to point to the target encapsulated object on the target processor as a location of the encapsulated object when the encapsulated object was not modified by the processing during the transfer or retransfer.

10. The system of claim 6, wherein the system comprises a plurality of sub-systems such that the plurality of encapsulated objects of the system are distributed over the plurality of sub-systems; and wherein the system comprises a location processor that provides information relating to an identification of a sub-system on which data are located.

11. The system of claim 6, wherein the system executes the receipt of a request to transfer the encapsulated object, the transfer of the encapsulated object, the determination whether the encapsulated object was modified by the processing during the transfer, and the re-transfer of the encapsulated object, for a plurality of encapsulated objects in a serial-loop fashion or in a parallel fashion.

* * * * *